United States Patent
Gao

(10) Patent No.: US 11,037,737 B2
(45) Date of Patent: Jun. 15, 2021

(54) ENERGY STORAGE TECHNOLOGY WITH EXTREME HIGH ENERGY DENSITY CAPABILITY

(71) Applicant: UCHICAGO ARGONNE, LLC, Chicago, IL (US)

(72) Inventor: Kaizhong Gao, North Oaks, MN (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 353 days.

(21) Appl. No.: 15/634,529

(22) Filed: Jun. 27, 2017

(65) Prior Publication Data

US 2018/0374658 A1    Dec. 27, 2018

(51) Int. Cl.
| | |
|---|---|
| *H01G 11/26* | (2013.01) |
| *H01G 11/52* | (2013.01) |
| *H01G 11/30* | (2013.01) |
| *H01G 11/70* | (2013.01) |
| *H01G 11/28* | (2013.01) |
| *H01G 11/36* | (2013.01) |
| *H01G 11/86* | (2013.01) |
| *H01G 11/46* | (2013.01) |

(52) U.S. Cl.
CPC ............. *H01G 11/26* (2013.01); *H01G 11/28* (2013.01); *H01G 11/30* (2013.01); *H01G 11/36* (2013.01); *H01G 11/52* (2013.01); *H01G 11/70* (2013.01); *H01G 11/86* (2013.01); *H01G 11/46* (2013.01)

(58) Field of Classification Search
CPC .......... H01G 11/26; H01G 11/36; H01G 4/30; H01G 11/24; H01G 11/86; H01G 11/52; H01G 11/30; H01G 11/70; H01G 11/28; H01L 28/90; H01M 4/133

USPC ......... 438/386, 381; 257/308; 361/502, 503, 361/508, 516
See application file for complete search history.

(56) References Cited

U.S. PATENT DOCUMENTS

| | | | |
|---|---|---|---|
| 2005/0062033 A1 | 3/2005 | Ichihara et al. | |
| 2006/0270177 A1* | 11/2006 | Park | H01L 28/91 438/386 |
| 2008/0218939 A1 | 9/2008 | Marcus et al. | |
| 2010/0304204 A1* | 12/2010 | Routkevitch | C01B 3/042 429/122 |
| 2011/0043967 A1 | 2/2011 | Kim et al. | |
| 2014/0015100 A1* | 1/2014 | Kwak | H01L 28/60 257/532 |
| 2015/0004373 A1* | 1/2015 | Shih | H01G 11/36 428/195.1 |
| 2015/0303001 A1 | 10/2015 | Warren et al. | |

FOREIGN PATENT DOCUMENTS

WO    WO-2016057983 A2 *    4/2016    ............. B82Y 30/00

* cited by examiner

*Primary Examiner* — Arun Ramaswamy
(74) *Attorney, Agent, or Firm* — Marshall, Gerstein & Borun LLP

(57) ABSTRACT

A capacitor includes a first electrode having a substrate and a plurality of nanostructures physically and electrically coupled to the substrate. The capacitor also includes a solid, non-conductive interlayer deposited over the nanostructures to coat the nanostructures, and extending between the nanostructures, and a second electrode deposited over the interlayer and extending between the nanostructures. The interlayer insulates the first and second electrode layers from one another.

11 Claims, 9 Drawing Sheets

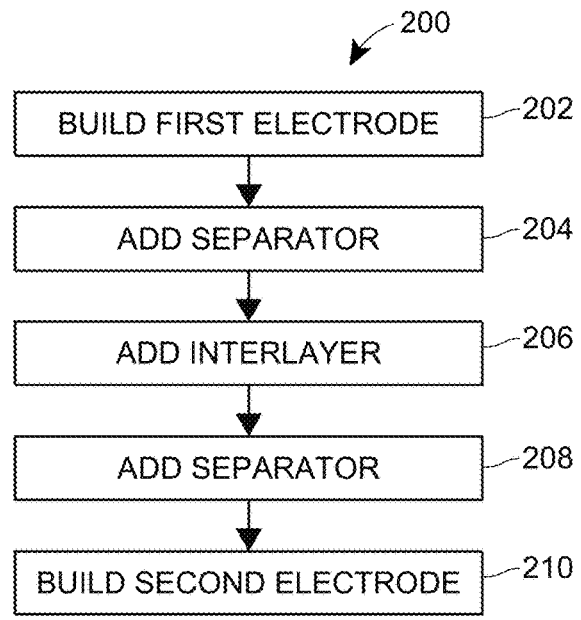
FIG. 6
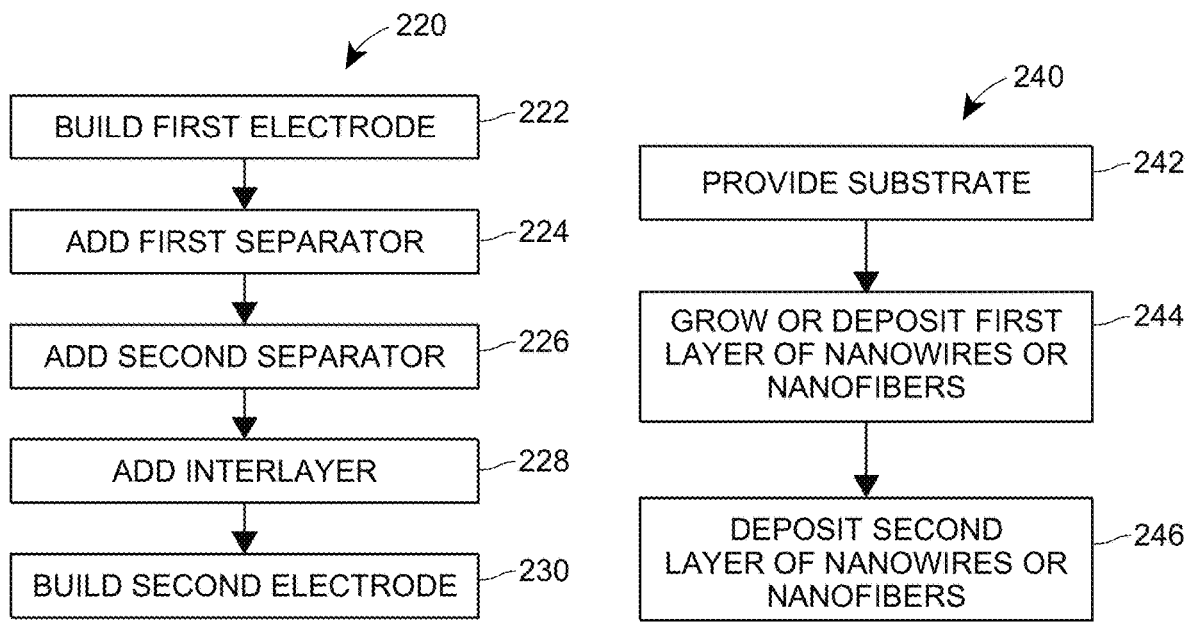
FIG. 7
FIG. 8

ENERGY STORAGE TECHNOLOGY WITH EXTREME HIGH ENERGY DENSITY CAPABILITY

STATEMENT REGARDING FEDERALLY SPONSORED RESEARCH OR DEVELOPMENT

This invention was made with government support under grant DE-ACO2-06CH11357, awarded by the U.S. Department of Energy. The government has certain rights in the invention.

FIELD OF THE DISCLOSURE

The present disclosure relates to a novel energy storage technology and extremely high density capacitor design, and a method of manufacturing the same.

BACKGROUND

A variety of energy storage and conversion technologies are presently known, and many have significant market presence. Lithium Ion (Li-Ion) based batteries, for example, are presently a primary energy storage means for consumer electronics and many other industries, including the electric vehicle industry, owing primarily to the high energy density that can be achieved. Of course, driving the use of battery storage devices having high energy density is the desire to have portable, always-on devices that last throughout the day (or longer) and nevertheless fit in a purse or pocket.

In addition to high energy density (i.e., on the order of 100-300+ Wh/kg), Li-ion and other similar technologies are characterized by relatively low power density, low to medium cycle life (how many charge cycles they can withstand) and slow charging speed. The high reactivity of Lithium also makes Li-ion batteries marginally safe at best, and these batteries have become infamous for causing fires and explosions in various consumer devices. They also have a fairly limited temperature range (well below 100 degrees C.), and create an outsize environmental impact due to difficulty of producing and recycling the batteries, as well as the limited lifetime of the batteries.

Recently, so-called super capacitor technology has been developed based on porous electrodes. These super capacitors have been used as alternative approaches in some applications where the energy density requirement is not very high. The growing use of super capacitors is driven by their fast charging speed, and high power density—they can provide upwards of 1,000 W/kg—and, as a result, super capacitors are being adopted in commercial applications including, for example, public transit systems.

While super capacitors' high power density and fast charging speed make them attractive in certain areas, known super capacitors also suffer from low energy density—typically one to two orders of magnitude less than Li-ion batteries. Thus, while providing distinct advantages in applications requiring fast charging and high power density, but having low energy density requirements, known super capacitors suffer from a number of drawbacks that limit their applicability in numerous applications. For example, known super capacitors are not well-suited to many (or perhaps most) consumer electronics devices.

SUMMARY OF THE DISCLOSURE

The presently disclosed embodiments address many of the issues described above with respect to Li-ion batteries and known super capacitors. The solid-state capacitors described herein address the disadvantages of each, having both high energy density and high power density, nearly unlimited cycle life, faster charging speed, excellent safety and reliability, and an operational temperature range extending into hundreds of degrees C. As such, the embodiments disclosed herein are suitable for use in consumer electronics, commercial applications, transportation applications, and nearly any application in which batteries of any type are presently employed.

In an embodiment, a capacitor comprises a first electrode that comprises a substrate and a plurality of nanostructures in physical contact with the substrate, the nanostructures increasing the conductive surface area of the first electrode. The capacitor also includes a solid, non-conductive interlayer deposited over the nanostructures to coat the nanostructures, and extending between the nanostructures. The capacitor further includes a second electrode deposited over the interlayer and extending between the nanostructures.

In various embodiments, the capacitor may: include a conductive first separator layer deposited between the first electrode and the interlayer; and/or include a second separator layer deposited between the first electrode and the interlayer or between the interlayer and the second electrode. The nanostructures may be non-conductive in embodiments where the conductive first separator layer is included. The nanostructures may be magnetic nanostructures.

A method of fabricating a capacitor includes forming a first electrode comprising a substrate having deposited thereon a plurality of nanostructures in physical contact with the substrate, depositing a solid, non-conductive interlayer over the nanostructures to coat the nanostructures such that the interlayer extends between the nanostructures and onto the surface of the substrate, and depositing a second electrode over the interlayer and extending between the nanostructures.

In various embodiments, the method may include depositing a first separator layer between the first electrode and the interlayer, the first separator layer coating the nanostructures such that the first separator layer extends between the nanostructures and wherein the solid-non-conductive interlayer is deposited over the first separator layer. Forming the first electrode may include depositing or growing a first layer of nanostructures on the substrate, and depositing a second layer of nanostructures on the first layer of nanostructures such that the nanostructures are stacked to increase the height of the first electrode. The method may further include depositing a second separator layer between the interlayer and the second electrode, the second separator layer extending between the nanostructures, and wherein the second electrode is deposited over the second separator layer. The method may include depositing a second separator layer between the first separator layer and the interlayer.

A capacitor formed from a plurality nanostructures, each nanostructure having a diameter, the capacitor having a plurality of layers arranged such that a cross-section taken perpendicular to a lengthwise axis of one nanostructure, from an outer circumferential surface of the nanostructure, through the nanostructure, to an outer circumferential surface of an adjacent nanostructure, includes a first electrode layer comprising the nanostructure, a solid, non-conductive interlayer, and a second electrode layer.

BRIEF DESCRIPTION OF THE DRAWINGS

The following detailed description will be more easily and better understood when considered in conjunction with the following figures, in which like reference numbers are employed to designate like structures. It should be understood that, with the exception of magnified images, the drawings are not to scale, as scaled drawings would not facilitate an understanding of the depicted structures.

FIG. 6 is a flow chart depicting a method of forming a capacitor;

FIG. 7 is a flow chart depicting an alternate method of forming a capacitor;

FIG. 8 is a flow chart depicting of building a first electrode; and

DETAILED DESCRIPTION

A capacitor in accordance with the present description features high energy density and high power density. The capacitor employs two electrodes with extremely large surface areas, A, separated by a distance, d, by an insulating interlayer having a high permittivity, ε. As such, the capacitance, C, determined according to the familiar equation $$C = \frac{\varepsilon A}{d} \quad \text{(Eq. 1)}$$

is maximized.

The devices and methods described result in electrodes having surface areas several orders of magnitude higher than traditional capacitors, while interlayer permittivity is also increased by several orders of magnitude over traditional capacitors, without relying on porous electrodes submerged in electrolytes. As a result, these methods, and the devices produced, provide energy densities comparable or higher than Li-ion batteries, without the disadvantages (slow charge times, memory effects that lead to poor cycle life, relatively low power density, high environmental impact, limited operating temperature range, and issues of reliability and stability that can lead to fires, explosions, and the like.

Figure 1:
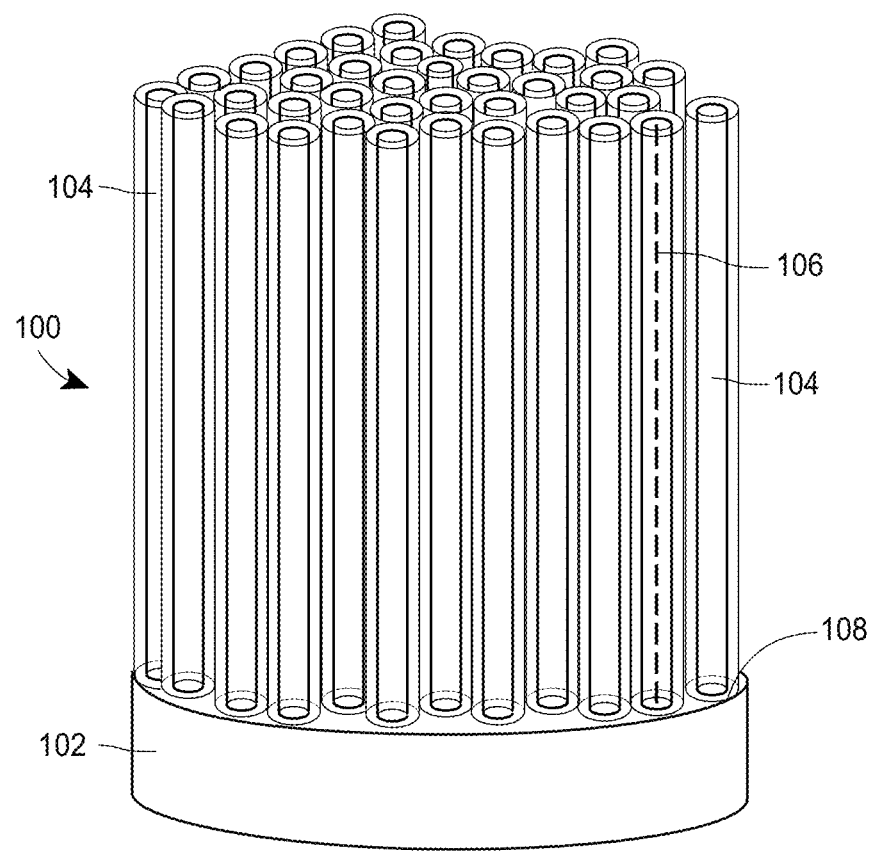
FIG. 1 illustrates an embodiment of an electrode of a capacitor.

In embodiments, a first electrode is built using nanostructures including conductive nanowires, nanofibers, and/or nanotubes to increase the surface area of the electrode. For ease of description, the term "nanostructures," as used throughout this specification, should be construed to mean any of the structures encompassed by nanowires, nanofibers, and/or nanotubes. The nanotubes, nanofibers, and nanowires are generally elongate structures having a large surface area-to-volume ratio, as described below with reference to the ratio of length to diameter. FIG. 1 illustrates one embodiment of a first electrode 100 of a capacitor. The first electrode 100 illustrated in FIG. 1 includes a conductive (e.g., metallic) substrate 102, on which a multiplicity of conductive nanostructures 104 are deposited, preferably in a vertical orientation such that the lengthwise axes 106 of the nanostructures 104 are generally perpendicular to a planar surface 108 of the substrate 102. As used throughout this specification, the term "deposited" means "placed," "formed," or "positioned," as appropriate, unless otherwise specified. The term "deposited" is not intended to specify the particular method of deposit (i.e., does not indicate specific methods such as atomic layer deposition). Of course, the illustration in FIG. 1A is not to scale, as a scaled illustration is impractical both here and in the remaining figures, and would not serve the purpose of aiding in the understanding of the present embodiments.

In any event, while, in some embodiments, the conductive nanostructures 104 may be grown on the substrate 102 by known methods, in other embodiments, including some preferred embodiments, the conductive nanostructures 104 may be produced separately from the substrate 102, and deposited onto the substrate 102 after creation. In various embodiments, electrospinning or electroplating may be employed to produce the conductive nanostructures 104. For instance, electrospinning may be employed to produce nanofibers with polymer. The fibers may pass through Hydrogen or other gasses at high temperature, after which the Oxygen and polymer may be removed, leaving metallic nanowires. The metallic nanowires may be deposited onto the substrate 102, which may comprise a metallic plate, for example. In other embodiments, electroplating may be employed to produce the conductive nanostructures 104 directly on the substrate 102. A metallic layer may be created, by plating or sputtering, on a (metallic or non-metallic) substrate to form the conductive substrate 102. A template or membrane may be added to the substrate 102—for instance, with a predetermined arrangement of holes or depressions—that will guide the formation of metallic wires that are plated onto the substrate 102. The template or membrane is then washed away (e.g., with NaOH), to leave the conductive nanostructures 104 on the conductive substrate 102.

A variety of materials are suitable for the first electrode 100 including, by way of example and not limitation, copper (Cu), cobalt (Co), iron (Fe), nickel (Ni), chromium (Cr), iron-cobalt alloys (CoFe), iron-nickel alloys (NiFe), silver (Ag), gold (Au), platinum (Pt), and other alloys including these materials; carbon (C), porous carbon, graphite, graphene, metal-doped carbon, porous metal-doped carbon, and graphene thin layers. In embodiments, copper is preferred. Moreover, there is no requirement that the substrate 102 comprise the same material as the nanostructures 104.

The height of the conductive nanostructures 104 (i.e., along the axes 106) is preferably many times the diameter of the nanostructures 104. In various embodiments, the ratio of the heights of the nanostructures 104 to their diameter is greater than 10, greater than 100, greater than 1,000, greater than 10,000, greater than 25,000, greater than 50,000, greater than 100,000, greater than 250,000, greater than 500,000, or greater than 1 million. Similarly, the height of the conductive nanostructures 104 is preferably many times the thickness of the metallic substrate 102 and, in various embodiments, the ratio of the heights of the nanostructures 104 to their diameter is greater than 10, greater than 100, greater than 1,000, greater than 10,000, greater than 25,000, greater than 50,000, greater than 100,000, greater than 250,000, greater than 500,000, or greater than 1 million.

Figure 2A:
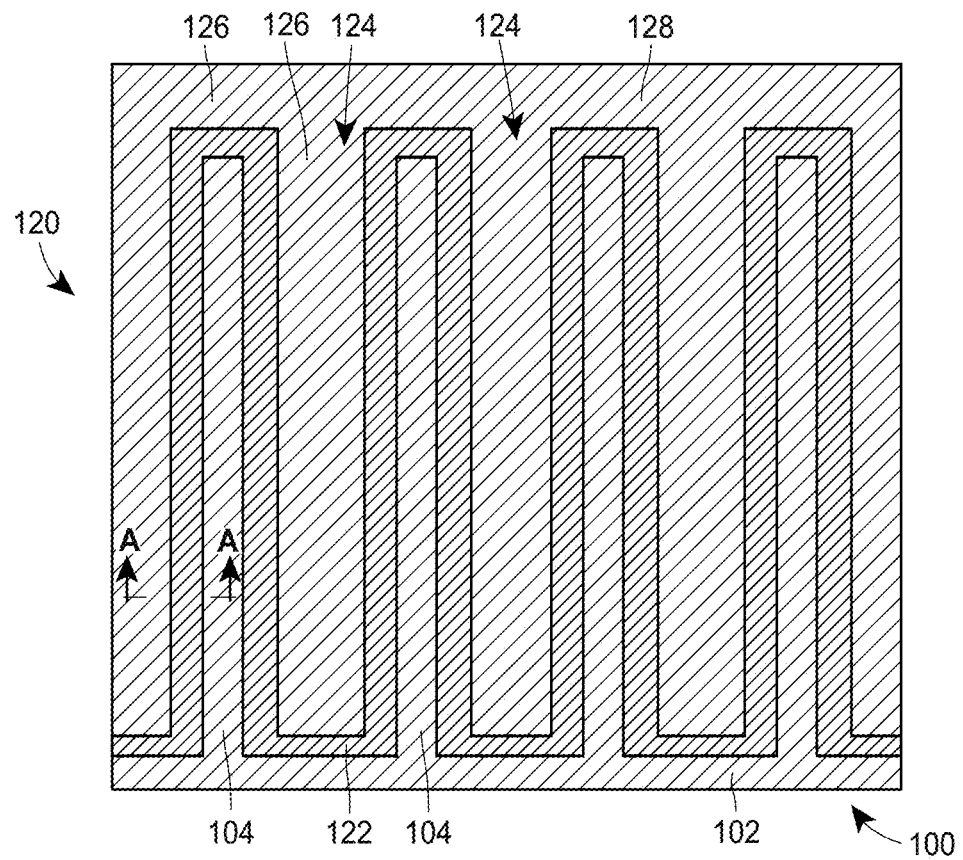
FIG. 2A is a schematic drawing depicting in cross section a structure of a capacitor according to an embodiment.

A non-conducting interlayer is deposited directly on the first electrode 100, in embodiments. FIG. 2A illustrates a cross section 120 of such an embodiment. In FIG. 2A, the conductive substrate 102 and the conductive nanostructures 104 are in direct contact with an interlayer 122. The interlayer 122 comprises a material having a high permittivity ($\varepsilon$), and is formed on the electrode 100 in a layer having a thickness sufficient to withstand the voltages desired to be applied to the capacitor. That is, the thickness of the interlayer 122 is determined, in part, according to the desired qualities of the capacitor with respect to leakage, breakdown voltage, and capacitance. Thicker interlayers 122 will exhibit less leakage and can be subjected to higher voltages without breakdown, but a thicker interlayer 122 will also increase the distance, d, between the electrodes of the capacitor, decreasing its total capacitance. The total thickness of the interlayer 122 may be, for example, between 1 nm and 100 nm, between 1 nm and 75 nm, between 1 nm and 50 nm, between 1 nm and 25 nm, between 1 nm and 10 nm, or between 10 nm and 10 µm. In any event, in particular embodiments, the interlayer 122 has a permittivity value in the range of 3-250,000, or 10-100,000, or 10-10,000, or 10-1,000, or 20-200, or 1,000-5,000, or 5-100, or greater than 10, or greater than 100, or greater than 1,000, or greater than 10,000, or greater than 100,000. For instance, the interlayer 122 may be a metallic oxide layer or a metallic nitride layer or SiN, or it may be based on multilayer structures. The layer or layers that form the interlayer 122 may be deposited, for example, by atomic layer deposition (ALD), to precisely control the thickness of the interlayer 122 formed on the first electrode 100. Additionally, the interlayer 122 may have a unique surface treatment, for example, heat treatment to modify surface texture or to remove oxygen, polymer, Carbon or other impurities using $H_2$, forming gas or other methods, before being coated with a metallic layer.

A variety of materials are suitable for the interlayer 122 including, by way of example and not limitation, $Al_2O_3$, $TiO_2$, $Ta_2O_3$, $HfO_2$, $BaTiO_3$, $CaCu_3Ti_4O_{12}$, $Pb[Zr_xTi_{1-x}]O_3$ and $SrTiO_3$.

Figure 3A:
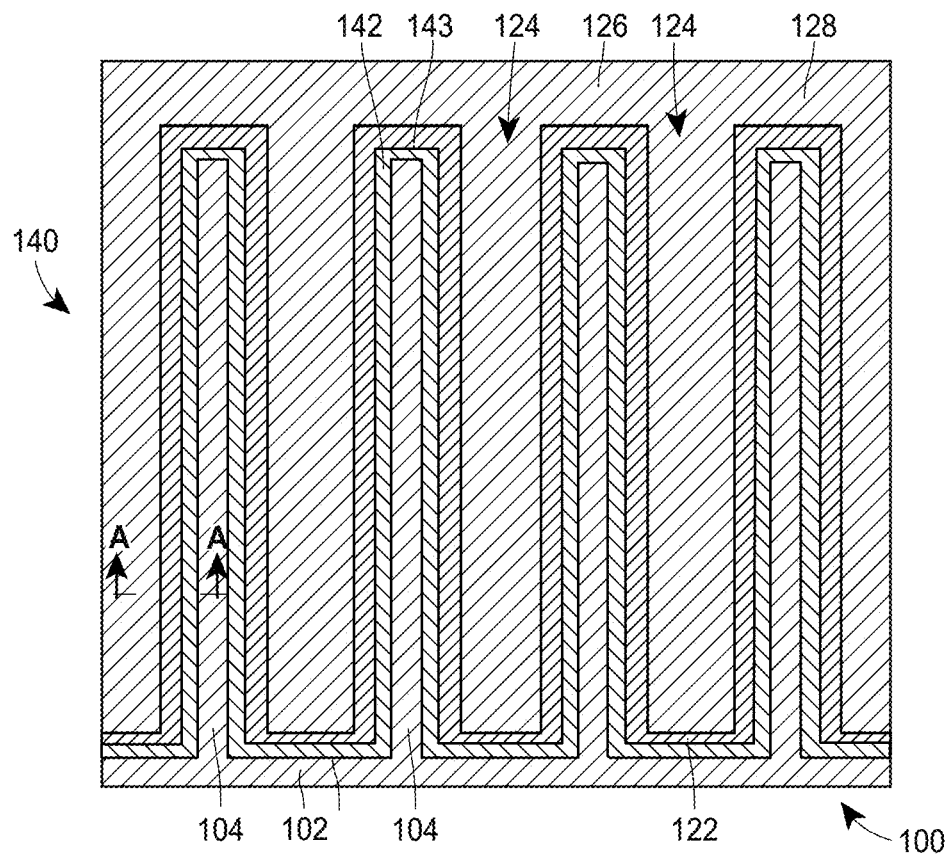
FIG. 3A is a schematic drawing depicting in cross section a structure of a capacitor according to another embodiment.
Figure 3B:
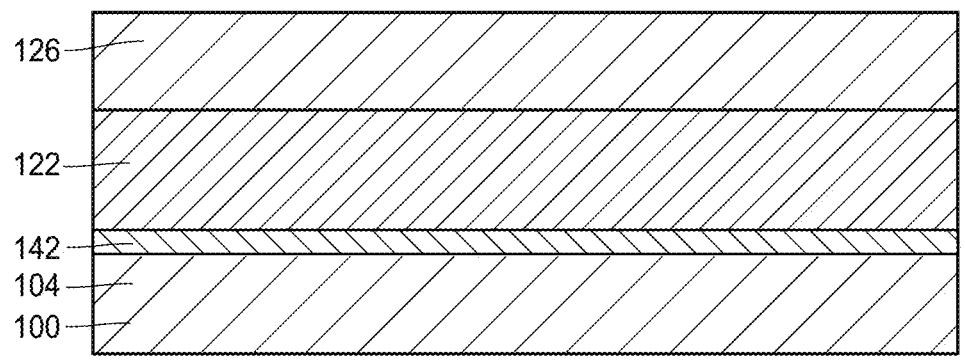
FIG. 3B is a cross section, taken across line A-A of the schematic in FIG. 3A, and illustrating the layer structure of the capacitor.
Figure 3C:
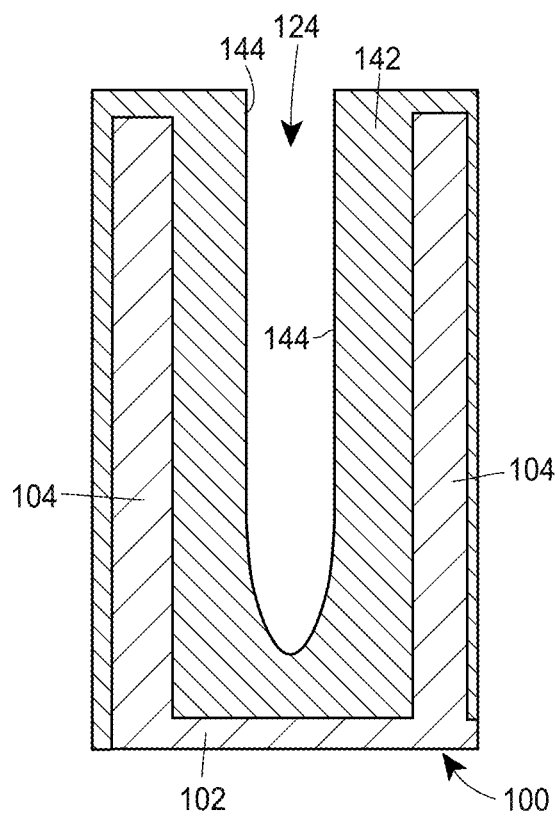
FIG. 3C is a cross-section depicting an area between two nanostructures of the embodiment of FIG. 3A, in which a particular one of the layers has a first thickness.
Figure 3D:
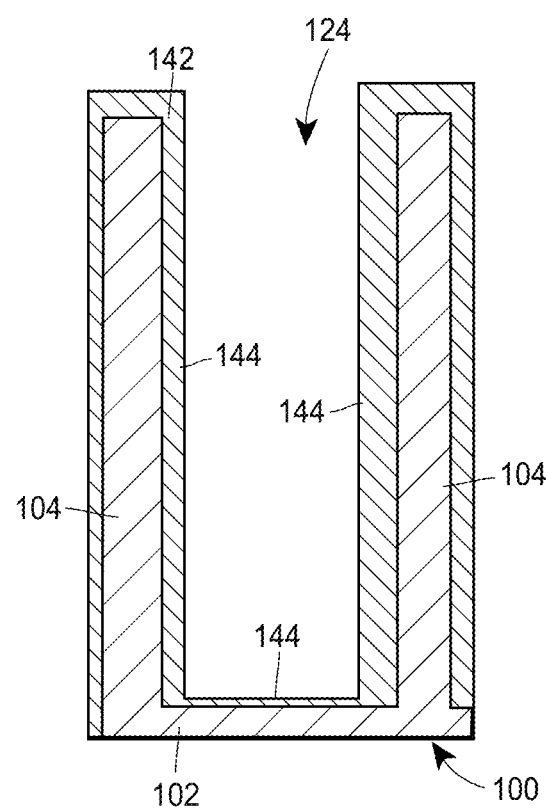
FIG. 3D is a cross-section depicting an area between two nanostructures of the embodiment of FIG. 3A, in which the particular one of the layers has a second thickness.

As one can readily appreciate, after coating the conducting nanostructures 104 with the interlayer 122, there will remain between the coated nanowire or nanofiber structures empty space 124 (see, e.g., FIGS. 3C and 3D). In the embodiment of the capacitor depicted in FIG. 2A, a second electrode 126 is built over the interlayer 122, filling some or all of the space 124. That is, the second electrode 126 is deposited, preferably using ALD or a similar process, to coat the interlayer 122 and fill some or all of the space 124 between the coated nanostructures 104. The second electrode 126 may, in some embodiments, be deposited to completely the fill the space 124, and further to build up a second, planar electrode 128 opposite the planar surface 108 of the substrate 102. By building the second electrode 126 to fill the space 124 between the coated nanostructures, the surface area of the second electrode 126 is closely matched to the surface area of the first electrode 100, contributing to the maximization of the capacitance of the capacitor. Of course, there is no requirement that the second electrode 126 have a planar electrode 128, so long as there is some electrical connection to the second electrode 126 that allows charge to flow to and from the second electrode 126.

As is the case with the first electrode 100, the second electrode 126 may be formed from any of a variety of materials including, by way of example and not limitation, copper (Cu), cobalt (Co), iron (Fe), nickel (Ni), chromium (Cr), iron-cobalt alloys (CoFe), iron-nickel alloys (NiFe), silver (Ag), gold (Au), platinum (Pt), and other alloys including these materials; carbon (C), porous carbon, graphite, graphene, metal-doped carbon, porous metal-doped carbon, and graphene thin layers, though in particular embodiments, copper is preferred due to its low cost and the fact that it is easy to deposit. Copper, of course, also exhibits high conductivity, which leads to low charge and discharge energy loss. The second electrode 126 is preferably formed using ALD or ALD and an additional process. As will be appreciated, depositing the second electrode with ALD alone will require a plurality of repeated ALD cycles to achieve the required thickness, as each ALD cycle can deposit only minimally (i.e., sub-nanometer) to the overall thickness of the second electrode 126. Alternatively, ALD may be employed to achieve a first portion of the overall thickness of the second electrode 126, and other methods, such as sputtering and/or plating may be used to deposit additional metallic material to the second electrode 126. Of course, different metallic materials (including alloys) may be used for the ALD and sputtering and/or plating processes.

Figure 2B:
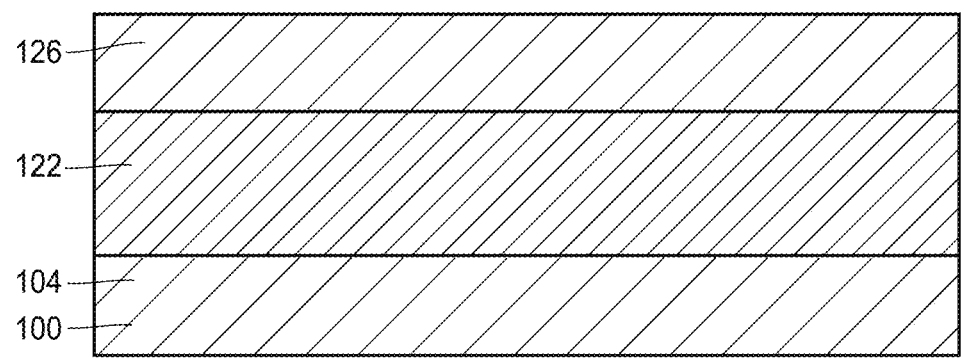
FIG. 2B is a cross section, taken across line A-A of the schematic in FIG. 2A, and illustrating the layer structure of the capacitor.

FIG. 2B is a cross-section along the line A-A of FIG. 2A and, in particular, shows a cross-section taken perpendicular to the lengthwise axis 106 of one of the conductive nanostructures 104, from an outer circumferential surface of the nanowire or nanofiber, through the nanowire or nanofiber 104, to an outer circumferential surface of an adjacent nanowire or nanofiber 104. Taken along this cross-section, it becomes clear that the nanostructures 104 and the second electrode 126, separated from one another by the interlayer 122, form what is essentially a parallel plate capacitor with an area, A, equal to the surface area of the nanostructures 104, and a separation distance, d, equal to the thickness of the interlayer 122.

FIG. 3A depicts a cross section 140 of an alternative embodiment of a capacitor embodying the concepts described herein. Like the capacitor depicted in the cross section 120 of FIG. 2A, the first electrode 100 includes the conductive substrate 102 and the conductive nanostructures 104, and the capacitor includes, in addition to the first electrode 100, the interlayer 122 and the second electrode 126. In a departure from the embodiment depicted in FIG. 2A, however, the embodiment depicted in FIG. 3A includes a first separator layer 142 deposited over the conductive substrate 102 and the conductive nanostructures 104 that make up the first electrode. The thickness of the separator layer 142 may be between 0.1 nm and 20 nm, in various embodiments, or between 0.1 and 10 nm, or between 0.1 and 5 nm, and, in embodiments, may be 1, 2, 3, 4, 5, 6, 7, 8, 9, 10, 11, 12, 13, 14, 15, 16, 17, 18, 19, or 20 nm, or any value in between. The separator layer 142 may also include (or function as) a seed layer 143. The seed layer 143 may facilitate adhesion to, or better texture and/or properties of, further layers deposited thereon. When the first electrode 100 is metallic, the seed layer 143 may also function to facilitate better contact between the nanostructures 104. In some embodiments, the seed layer 143 may be unnecessary, due to the choice of materials for the first electrode 100 and the nanostructures 104. It is worth noting that in embodiments, the thickness (vertical or horizontal) of the layers may be equal or substantially similar (i.e., within 20%) to one another.

The first separator layer 142, in various embodiments, serves a variety of purposes. Adding the first separator layer 142 over the first electrode 100 helps to ensure that all of the nanostructures 104 are in contact with one another and ensures good electrical conductivity throughout the first electrode 100. As a result, energy loss (e.g., in the form of heat) is reduced or minimized because the resistance within the device is decreased. The first separator layer 142 may be deposited in a single layer or multiple layers. In any event, the layer or layers that form the first separator layer 142 may, in embodiments, be deposited by ALD, to precisely control the thickness of the first separator layer 142 formed on the first electrode 100. The first separator layer 142 may also serve as a seed layer for the interlayer 122.

In some embodiments that include the first separator layer 142, the nanostructures 104 may, in fact, be formed of a non-conductive material and, as a result, may be non-conductive. That is, the nanostructures 104 may be non-conductive, and the first separator layer 142 may provide a conductive "skin" over the nanostructures 104 and the surface 108 of the substrate 102, ensuring good electrical conductivity between the nanostructures 104, and between the nanostructures 104 and the substrate 102. In such embodiments, the nanostructures 104 may be formed, by way of example and without limitation, from non-conductive materials such as $TiO_2$, $Ta_2O_5$, $HfO_2$, Carbon-based nanotubes, graphene, SiN, TiN, other oxide and nitride materials, and the like.

The materials forming the first separator layer 142 may be the same materials as used to form the first electrode 100 (selected from Cu, Co, Fe, Ni, Cr, CoFe, NiFe, Ag, Au, Pt, and other alloys including these materials; C, graphite, graphene or metal-doped carbon, and graphene thin layers), or can be a selection from any of the single element metals, metallic alloys, or other conductive composites. In an embodiment, copper is deposited by ALD to form the first separator layer 142. In other embodiments, a material is selected to enable better coating of the first separator layer 142 by the interlayer 122. Preferably, the first separator layer 142 is deposited just to sufficient thickness to coat the entirety of the surface of the first electrode 100, without creating areas that, as a result of the first separator layer 142, become impervious to coating by the interlayer 122. That is, it is desirable to avoid decreasing the surface area of the first separator layer 142 in contact with the interlayer 122. FIG. 3C depicts an example of a first separator layer 142 deposited to such a thickness as to decrease the area of a surface 144 of the first separator layer 142 that can be in contact with the interlayer 122, in contrast with the example depicted in FIG. 3D, in which the first separator layer 142 has a thickness that preserves much of the area of the surface 144 of the first separator layer 142 that can be in contact with the interlayer 122. Specifically, the thickness of the first separator layer may be less than the thickness of the interlayer. Additionally, it should be understood that, while depicted in the figures as having slight variation between the horizontal thickness of the layers and the vertical thickness of the layers, the thickness of a layer will be uniform in many instances, especially where ALD is employed to deposit the layer.

Like FIG. 2B, FIG. 3B is a cross-section along the line A-A of FIG. 3A and, in particular, shows a cross-section taken perpendicular to the lengthwise axis 106 of one of the conductive nanostructures 104, from an outer circumferential surface of the nanowire or nanofiber, through the nanowire or nanofiber 104, to an outer circumferential surface of an adjacent nanowire or nanofiber 104. In contrast to FIG. 2B, however, the cross-section depicted in FIG. 3B includes the first separator layer 142 between the interlayer 122 and the nanostructures 104 of the first electrode 100.

Figure 4A:
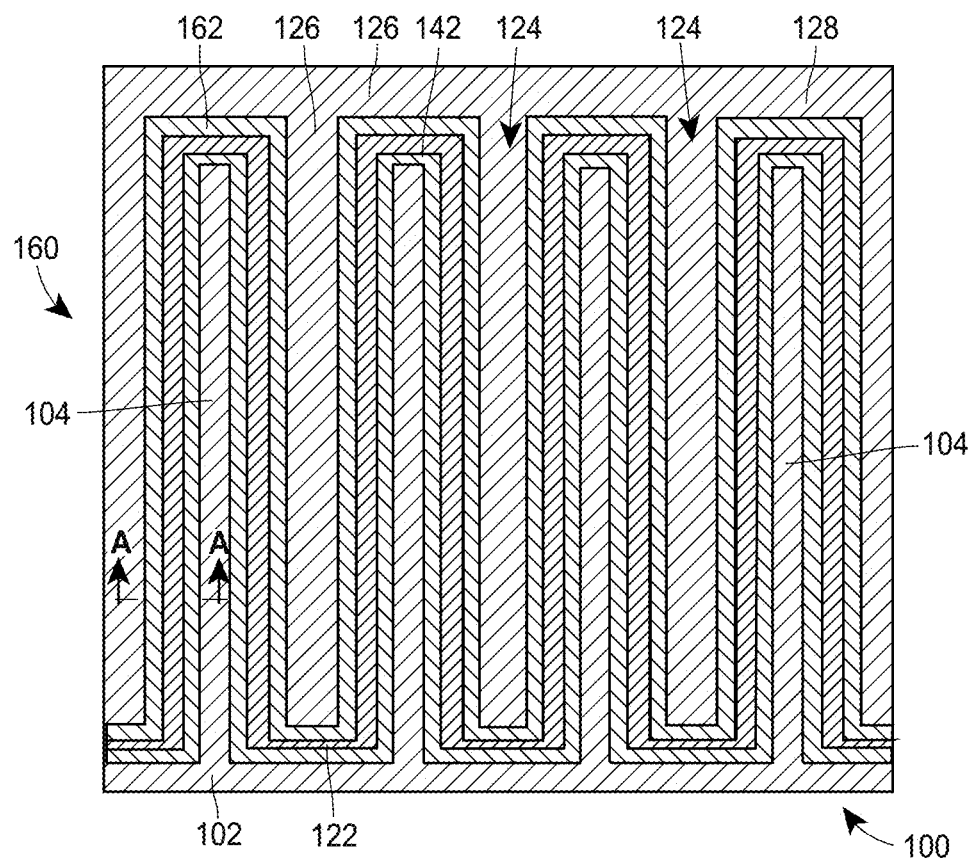
FIG. 4A is a schematic drawing depicting in cross section a structure of a capacitor according to yet another embodiment.

In still other embodiments, the capacitor includes a second separator layer disposed between the interlayer 122 and the second electrode 126. Like FIGS. 2A and 3A, FIG. 4A depicts a cross section 160 of such an embodiment of a capacitor. Similarly, the capacitor of the embodiment depicted in FIG. 4A includes the first electrode 100 having the conductive substrate 102 and the conductive nanostructures 104, and the capacitor includes, in addition to the first electrode 100, the interlayer 122 and the second electrode 126. Like the capacitor depicted in FIG. 3A, that of FIG. 4A also includes the first separator layer 142. However, unlike the embodiments described previously, in FIG. 4A, the capacitor is illustrated as having a second separator layer 162.

Like the first separator layer 142 may serve as a seed layer 143 for the interlayer 122, the second separator layer 162, may serve as a seed layer for the growth or deposition of the second electrode 126. The second separator layer 162 is, in an embodiment, deposited by ALD, using the same materials as either the first electrode 100 or the second electrode 126. Additionally, the material or materials forming the second separator layer 162 may be selected from Cu, Co, Fe, Ni, Cr, CoFe, NiFe, Ag, Au, Pt, and other alloys including these materials; C, graphite, graphene or metal-doped carbon, and graphene thin layers, or can be a selection from any of the single element metals. In an embodiment, copper is deposited by ALD to form the second separator layer 162. In other embodiments, a material is selected to enable better coating of the interlayer 122, or specifically to provide seed for the second electrode 126. Preferably, the second separator layer 162 is deposited just to sufficient thickness to coat the entirety of the surface of the interlayer 122, without creating areas that, as a result of the second separator layer 162, become impervious to coating by the second electrode 126. That is, it is desirable to avoid decreasing the surface area of the second separator layer 162 in contact with the second electrode 126. Specifically, the thickness of the second separator layer may be less than the thickness of the interlayer.

Figure 4B:
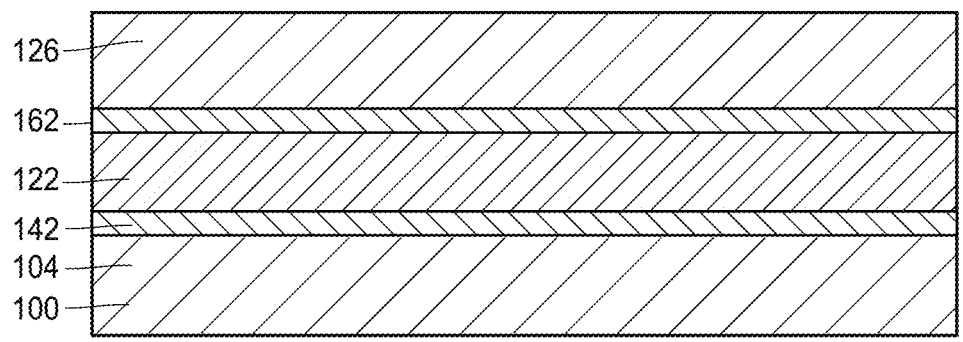
FIG. 4B is a cross section, taken across line A-A of the schematic in FIG. 4A, and illustrating the layer structure of the capacitor.

In embodiments, however, one property of the second separator layer 162 is that it serves as an additional layer to prevent leakage and increase breakdown voltage. As a result of this function, in these embodiments the second separator layer 162 does not provide metallic contact. While the interlayer 122 serves to increase permittivity, some materials with high permittivity have a relatively low breakdown voltage and, accordingly, will limit the voltages that can be applied to the capacitor. The second separator layer 162, in these embodiments, may serve to increase the breakdown voltage. In embodiments, because of this function of the second separator layer 162, the relative positions of the second separator layer 162 and the interlayer 122 may be reversed (relative to what is depicted in FIG. 4B). When the second separator layer 162 serves to increase breakdown voltage, a variety of materials having high breakdown voltage, are suitable for the second separator layer 162 including, by way of example and not limitation, $Al_2O_3$, $TiO_2$, $Ta_2O_3$, $HfO_2$, $BaTiO_3$, $CaCu_3Ti_4O_{12}$, $Pb[Zr_xTi_{1-x}]O_3$ and $SrTiO_3$.

FIG. 4B is a cross-section along the line A-A of FIG. 4A. FIG. 4B shows a cross-section taken perpendicular to the lengthwise axis 106 of one of the conductive nanostructures 104, from an outer circumferential surface of the nanostructure, through the nanostructure 104, to an outer circumferential surface of an adjacent nanostructure 104. The cross-section depicted in FIG. 4B shows a portion of the nanostructure 104 forming the first electrode 100, the first separator layer 142, the interlayer 122, the second separator layer 162, and the second electrode 126.

As described above, the conductive nanostructures 104 may be grown on the substrate 102, or may be produced separately from the substrate 102 and deposited on the substrate 102 after creation. In embodiments in which the nanostructures 104 are produced separately and deposited on the substrate 102 or, in fact, in embodiments where they are grown on the substrate 102, the conductive nanostructures 104 may be magnetic (made from a magnetic material or otherwise magnetized) to help ensure good contact with the (metallic) substrate 102. In addition to ensuring good contact with the substrate 102, the use of magnetic nanostructures may facilitate an increase in nanostructure height (and therefore total surface area of the first electrode 100), while not requiring an additional substrate or electrode—which takes up significant space—on which to grow additional nanostructures. Specifically, while previously described embodiments (e.g., in FIGS. 2A, 3A, and 4A) have depicted a single layer of nanostructures 104, in some embodiments, magnetic nanostructures may be stacked to increase the height (i.e., along the lengthwise axis of the nanostructure) of the nanostructures and, in turn, the surface area of the first (and second) electrodes.

That is, rather than growing or depositing nanostructures 104 on the substrate 102, depositing the second electrode 126, and growing or depositing additional nanostructures 104 (which may be done in embodiments), additional nanostructures 104 may be deposited as part of the first electrode 100, to increase the surface area of the first electrode 100 without taking up space with an intermediate electrode. After the nanostructures 104 are grown or deposited on the substrate 102, additional, magnetic nanostructures 104 may be deposited. Using magnetic nanostructures 104 will ensure that the nanostructures 104 stick together, in contrast to non-magnetic nanostructures 104 that might not contact one another. As a result, if each nanostructure 104 is on the order of 10-100 µm, the total height of the nanostructures 104, after depositing several layers, could be on the order of 0.1-10 mm. After depositing the additional nanostructures 104 (in one or more layers) the surface treatment of the layer could be applied to remove impurities, oxygen, etc., and the first separator layer 142 may be added to ensure good electrical contact between all of the nanostructures 104. Of course, there is no requirement that the "layers" of nanostructures be ordered layers. Additionally, it will be understood that there is no requirement that the layers of nanostructures be in end-to-end contact.

Figure 5A:
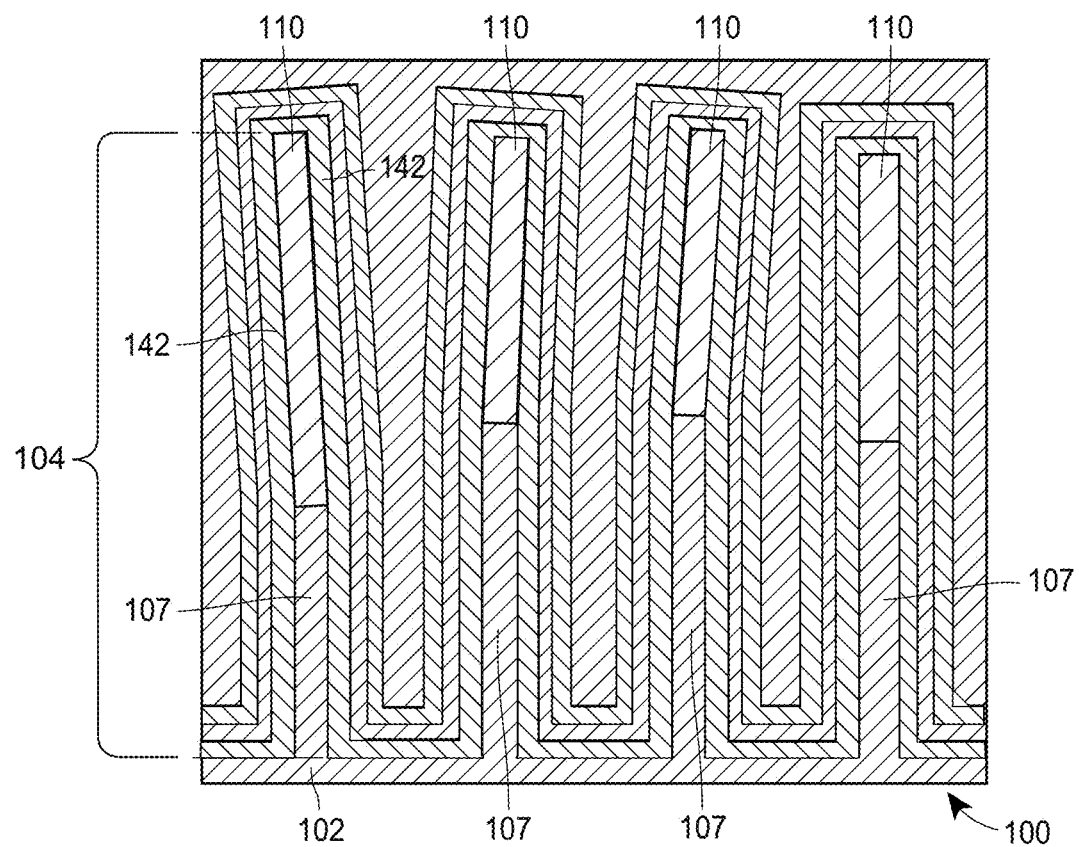
FIG. 5A is a schematic drawing depicting in cross section a structure of a capacitor according to still another embodiment.

FIG. 5A illustrates one such embodiment in which magnetic nanostructures are stacked to form nanostructures with greater height. Specifically, a first layer of magnetic nanostructures 107 may be grown or deposited onto the substrate 102, just as described with respect to the embodiments depicted in FIGS. 2A, 3A, and 4A. Unlike those embodiments, however, FIG. 5A illustrates that a second layer of magnetic nanostructures 110 may be deposited on top of the layer of magnetic nanostructures 107. Optimally, the magnetic nanostructures align end to end—for instance by exposing them to a magnetic field—to significantly increase the overall height of the nanostructures 104 that, with the substrate 102, form the first electrode 100. However, optimal alignment is not required for proper functioning of the capacitor. Instead, it is sufficient if the magnetic nanostructures 107, 110 are coupled together in a manner that increases the overall height of the nanostructures 104 (i.e., with respect to the planar surface of the substrate 102) and/or, in any event, the overall surface area of the first electrode 100. That is, there is no requirement, per se, that the nanostructures 104 be strictly vertical or strictly stacked (though in embodiments, they may be), but rather that the nanostructures 104 be in contact with one another in a manner that increases the exposed surface area of the first electrode 100, while leaving room for the deposition of the interlayer 122, the second electrode 126 and, if included, the first and second separator layers 142 and 162, respectively.

Figure 5B:
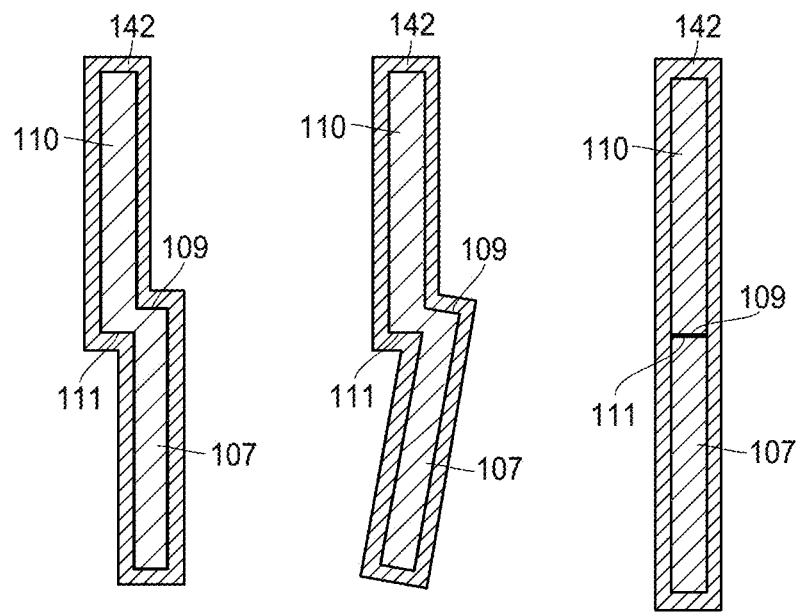
FIG. 5B illustrates the stacked nanostructures depicted in FIG. 5A as forming part of the first electrode.

Referring briefly to FIG. 5B, magnetic nanostructures 107, 110 are depicted in three potential "stacked" formations. Of particular note is that respective ends (109, 111) of the magnetic nanostructures 107, 110 need not be in contact with one another. It is sufficient that the magnetic nanostructures 107, 110 contact one another in a manner that forms a generally vertical (again, with respect to the planar surface of the substrate 102) structure. Of course, other formations not depicted in FIG. 5B are possible and would not depart from the spirit of the disclosure, so long as they increase the overall surface area of the first electrode 100. The deposition (via ALD or other methods) of the first separator layer 142, serves to ensure good contact area and to change the electrical coupling between the nanostructures 107, 110 from a point or patch contact to a controllable surface area, and allowing charge to move through the first separator layer 142 rather than through the smaller point or patch contact formed at the junction between the nanostructures 107, 110.

Figure 5C:
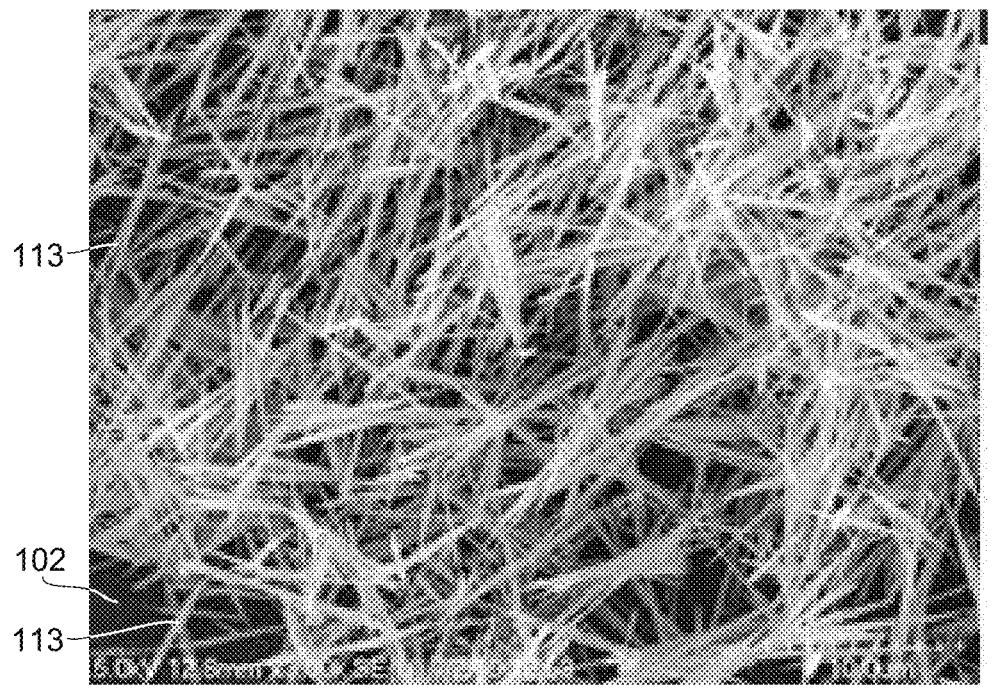
FIGS. 5C and 5D are highly magnified images of non-ordered nanostructures forming part of the first electrode.
Figure 5D:
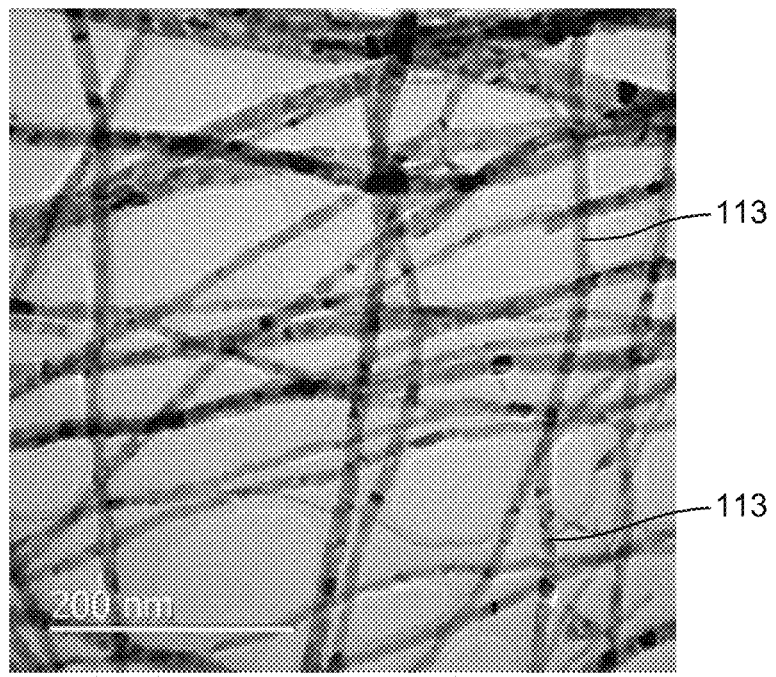

Referring now to FIGS. 5C and 5D, magnetic nanofibers 113 are depicted in a non-ordered fashion. The magnetic nanofibers 113 may be created by electrospinning or any known process and deposited in non-ordered, random fashion on the substrate 102, such that the magnetic nanofibers 113 are coupled to one another electrically and/or physically to increase the surface area of the first electrode 100. Though in embodiments the nanofibers are conductive and, thus, will be electrically connected to one another when physically coupled to one another, it is possible in embodiments to use non-conductive nanostructures 104 if the first separator layer 142 is employed, coating the nanostructures 104 in a conductive material so that they are electrically coupled to one another and to the substrate 100. Additionally, magnetic and/or electric fields may be employed to align the nanostructures, if desired, for example to optimize a feature or property of the contact between them, or a feature or property of the overall device.

Turning again to FIG. 5A, the nanostructures 104 having been coated by the first separator layer 142, are then coated with the interlayer 122, optionally with the second separator layer 162, and with the second electrode, as in previously described embodiments.

It will be apparent at this point that the surface area of the first electrode 100 and, consequently, of the second electrode 126, will be heavily dependent on the diameter of the conductive nanostructures 104. In embodiments, the conductive nanostructures 104 have a diameter on the order 20 nm and, in particular, between 15 nm and 20 nm, between 10 nm and 20 nm, between 5 nm and 20 nm, etc. Of course, the power and/or energy density required for a particular application may dictate the required surface area of the capacitor and, accordingly, the diameter of the conductive nanostructures required to create sufficient surface area to meet those requirements. Thus, while embodiments include nanostructures having diameters smaller than 20 nm, larger diameter nanostructures may suffice in some applications. In some specific embodiments, however, the diameters of the nanostructures are smaller than 12 nm, resulting in charge densities exceeding 1 Coulomb per $cm^2$ of substrate.

FIG. 6 is a simplistic flow chart showing a method 200 of creating the capacitor described herein. First, the first electrode is built (block 202) by forming or depositing the conductive nanostructures on the conductive substrate. Optionally, a first separator layer is deposited to coat the nanostructures such that the first separator layer extends between the nanostructures (block 204). A solid, non-conductive interlayer is deposited over the nanostructures (or over the first separator layer, if deposited), coating the nanostructures such that the interlayer extends between the nanostructures (block 206), and prevents contact between the first and second electrodes. Optionally, a second separator layer is deposited to coat the interlayer such that the second separator layer extends between the nanostructures (block 208). The second electrode is then deposited over the interlayer (or over the second separator layer, if deposited), such that the second electrode fills some or all of the remaining space between the nanostructures, and, optionally, builds up a second planar surface opposite the substrate of the first electrode (block 210).

FIG. 7 is a simplistic flow chart showing an alternate method 220 of creating the capacitor described herein. First, the first electrode is built (block 222) by forming or depositing the conductive nanostructures on the conductive substrate. Optionally, a first separator layer is deposited to coat the nanostructures such that the first separator layer extends between the nanostructures (block 224). Optionally, a second separator layer is deposited to coat the first separator layer such that the second separator layer extends between the nanostructures (block 226). A solid, non-conductive interlayer is deposited over the nanostructures (or over the first separator layer and/or second separator layer, if deposited), coating the nanostructures such that the interlayer extends between the nanostructures (block 228). The second electrode is then deposited over the interlayer, such that the second electrode fills some or all of the remaining space between the nanostructures, and, optionally, builds up a second planar surface opposite the substrate of the first electrode (block 230).

FIG. 8 is a simplistic flow chart showing a method 240 of building the first electrode (e.g., the blocks 202 and 222 in FIGS. 6 and 7, respectively). First, a substrate is provided (block 242). A first layer of nanostructures is grown or deposited onto the substrate (block 244). Optionally, in embodiments, a second layer (and/or additional layers) of nanostructures is deposited (block 246).

Figure 9:
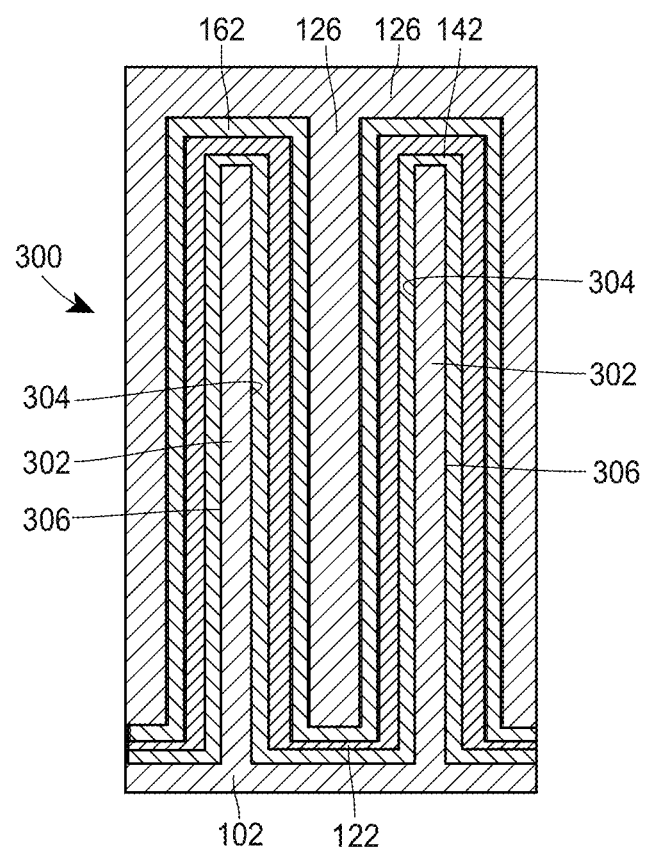
FIG. 9 is a schematic drawing depicting in cross section a structure of a capacitor according to an embodiment using nanotubes.

Though described and illustrated throughout the specification with respect to nanowires and nanofibers, nanotubes may also be employed as the nanostructures 104, as mentioned previously. FIG. 9 depicts a portion 300 of a capacitor using nanotubes and illustrates some of the differences inherent in using nanotubes 302 as the microstructure 104 and, specifically, depicts a cross-section of a single nanotube 302. It will be recognized that in the event that nanotubes 302 are employed as the nanostructures 104, the surface area of the first electrode 100 may be significantly increased, as the nanotubes 302 include both an internal surface 304 and an external surface 306. Thus, while the diameter of the nanotubes 302 may be increased in order to facilitate and/or allow space for the deposit of the interlayer 122, the second electrode 126, and the optional first and second separation layers 142, 162, the use of the nanotubes 302 may still increase the overall surface area of the first electrode 100 (and, by extension, of the second electrode 126).

As will be appreciated, the capacitors in accordance with the described and contemplated embodiments provide numerous advantages over present technology, including: high energy density; high power density; extremely fast charging speed; improved safety and reliability (in part, because there is no liquid, no moving parts, and no highly reactive metals); a large range of operational temperatures; no memory effects; an extremely low discharge rate; limited negative environmental impact; no (or low) leakage current; energy efficient charging; a simple manufacturing process; and, eventually, lower cost. As a result, the capacitors described herein have application in a wide variety of applications, including in consumer electronics (mobile telephones, laptops and tablet computers, etc.), public transportation systems (in buses, light rail, etc.), automobiles, solar-generated power storage, to name a few.

The following list of aspects reflects a variety of the embodiments explicitly contemplated by the present application. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A capacitor comprising: a first electrode comprising a substrate and a plurality of nanostructures physically and electrically coupled to the substrate; a solid, non-conductive interlayer deposited over the nanostructures to coat the nanostructures, and extending between the nanostructures; and a second electrode deposited over the interlayer and extending between the nanostructures, wherein the interlayer insulates the first and second electrode layers from one another.

2. A capacitor according to aspect 1, further comprising a first separator layer deposited between the first electrode and the interlayer.

3. A capacitor according to aspect 1 or aspect 2, wherein the plurality of conductive nanostructures comprises elongated nanostructures, each comprising two or more stacked nanostructures.

4. A capacitor according to any one of the preceding aspects, wherein the nanostructures are arranged generally perpendicular to a surface of the substrate to which the nanostructures are coupled.

5. A capacitor according to any one of the preceding aspects, wherein the nanostructures comprise magnetic nanostructures.

6. A capacitor according to any one of the preceding aspects, further comprising a conductive first separator layer deposited between the first electrode and the interlayer, wherein the thickness of the first separator layer is less than the thickness of the interlayer.

7. A capacitor according to aspect 6, wherein the nanostructures are non-conductive.

8. A capacitor according to any one of the preceding aspects, further comprising a second separator layer deposited between the interlayer and the second electrode.

9. A capacitor according to any one of aspects 1 to 7, further comprising a second separator layer deposited between the second electrode and the interlayer, wherein the thickness of the second separator layer is less than the thickness of the interlayer.

10. A capacitor according to any one of aspects 1 to 7, further comprising a second separator layer deposited between the first electrode and the interlayer, the second separator layer being non-conductive.

11. A capacitor according to any one of the preceding aspects, wherein the height of the nanostructures exceeds the diameter of the nanostructures by a factor of 100 or greater.

12. A capacitor according to any one of the preceding aspects, wherein the height of the nanostructures exceeds the diameter of the nanostructures by a factor of 1000 or greater.

13. A capacitor according to any one of the preceding aspects, wherein the height of the nanostructures exceeds the diameter of the nanostructures by a factor of 100000 or greater.

14. A capacitor according to any one of the preceding aspects, wherein the height of the nanostructures exceeds the thickness of the substrate by a factor of 1000 or greater.

15. A capacitor according to any one of the preceding aspects, wherein the height of the nanostructures exceeds the thickness of the substrate by a factor of 100000 or greater.

16. A capacitor according to any one of the preceding aspects, wherein the nanostructures comprise a material different from the substrate material.

17. A capacitor according to any one of the preceding aspects, wherein the nanostructures are formed and then deposited on the substrate.

18. A capacitor according to any one of the preceding aspects, wherein the capacitor has a charge density of 1 Coulomb per $cm^2$ of substrate.

19. A capacitor according to any one of the preceding aspects, wherein the interlayer has a relative permittivity greater than 10.

20. A method of fabricating a capacitor, the method comprising: forming a first electrode comprising a substrate having deposited thereon a plurality of nanostructures physically and electrically coupled to the substrate; depositing a solid, non-conductive interlayer over the nanostructures to coat the nanostructures such that the interlayer extends between the nanostructures; and depositing a second electrode over the interlayer and extending between the nanostructures.

21. A method according to aspect 20, further comprising depositing a first separator layer between the first electrode and the interlayer, the first separator layer coating the nanostructures such that the first separator layer extends between the nanostructures, and wherein the solid, non-conductive interlayer is deposited over the first separator layer.

22. A method according to aspect 20 or aspect 21, wherein forming the first electrode comprises depositing or growing a first layer of nanostructures on the substrate, and depositing a second layer of nanostructures on the first layer of nanostructures, such that the nanostructures are stacked to increase the height of the first electrode.

23. A method according to any one of aspects 20 to 22, wherein the nanostructures are arranged generally perpendicular to a surface of the substrate to which the nanostructures are coupled.

24. A method according to any one of aspects 20 to 23, wherein the nanostructures comprise magnetic nanostructures.

25. A method according to any one of aspects 20 to 24, further comprising depositing a first separator layer between the first electrode and the interlayer, the first separator layer coating the nanostructures such that the first separator layer extends between the nanostructures, and wherein the solid, non-conductive interlayer is deposited over the first separator layer, and wherein the thickness of the first separator layer is less than the thickness of the interlayer.

26. A method according to any one of aspects 20 to 25, further comprising depositing a second separator layer between the interlayer and the second electrode, the second separator layer extending between the nanostructures, and wherein the second electrode is deposited over the second separator layer.

27. A method according to any one of aspects 20 to 25, further comprising depositing a second separator layer between the interlayer and the second electrode, the second separator layer coating the nanostructures such that the second separator layer extends between the nanostructures, and wherein the second electrode is deposited over the second separator layer, and wherein the thickness of the second separator layer is less than the thickness of the interlayer.

28. A method according to any one of aspects 20 to 24, further comprising depositing a second separator layer between the first separator layer and the interlayer.

29. A method according to any one of aspects 20 to 28, wherein the second separator layer does not provide metallic contact between two layers adjacent to the second separator layer.

30. A method according to any one of aspects 20 to 29, wherein the height of the nanostructures exceeds the diameter of the nanostructures by a factor of 100 or greater.

31. A method according to any one of aspects 20 to 30, wherein the height of the nanostructures exceeds the diameter of the nanostructures by a factor of 1000 or greater.

32. A method according to any one of aspects 20 to 31, wherein the height of the nanostructures exceeds the diameter of the nanostructures by a factor of 100000 or greater.

33. A method according to any one of aspects 20 to 32, wherein the height of the nanostructures exceeds the thickness of the substrate by a factor of 1000 or greater.

34. A method according to any one of aspects 20 to 33, wherein the height of the nanostructures exceeds the thickness of the substrate by a factor of 10000 or greater.

35. A method according to any one of aspects 20 to 34, wherein the nanostructures comprise a material different from the substrate material.

36. A method according to any one of aspects 20 to 35, wherein forming a first electrode comprising a substrate having deposited thereon a plurality of nanostructures physically and electrically coupled to the substrate comprises forming the nanostructures and then depositing the nanostructures on the substrate.

37. A method according to any one of aspects 20 to 36, wherein the interlayer has a relative permittivity greater than 10.

38. A method according to any one of aspects 20 to 37, wherein the interlayer is deposited by atomic layer deposition (ALD).

39. A method according to any one of aspects 20 to 38, wherein the second electrode is deposited by (i) atomic layer deposition (ALD), or (ii) by ALD and sputtering and/or plating.

40. A method according to any one of aspects 20 to 39, wherein the second electrode fills any remaining space between the nanostructures.

41. A method according to aspect 40, wherein the second electrode is deposited to form a second planar substrate opposite the substrate of the first electrode.

42. A method according to any one of aspects 20 to 41, wherein a first separator layer is deposited between the interlayer and the first electrode, and wherein the first separator layer is deposited by atomic layer deposition (ALD).

43. A method according to any one of aspects 20 to 42, wherein a second separator layer is deposited between the interlayer and the second electrode, and wherein the second separator layer is deposited by atomic layer deposition (ALD).

44. A method according to any one of aspects 20 to 42, wherein a second separator layer is deposited between the interlayer and the second electrode, and wherein the second separator layer is deposited by atomic layer deposition (ALD) and sputtering processes.

45. A capacitor formed from a plurality nanostructures, each nanostructure having a diameter, the capacitor having a plurality of layers arranged such that a cross-section taken perpendicular to a lengthwise axis of one nanostructure, from an outer circumferential surface of the nanostructure, through the nanostructure, to an outer circumferential surface of an adjacent nanostructure, comprises: a first electrode layer comprising the nanostructure; a solid, non-conductive interlayer; and a second electrode layer.

46. A capacitor according to aspect 45, wherein the cross-section further comprises a separator layer between the first electrode layer and the solid, non-conductive interlayer.

47. A capacitor according to aspect 46, wherein the cross-section further comprises a separator layer between the solid, non-conductive interlayer and the second electrode.

The invention claimed is:

1. A capacitor comprising:
a first electrode comprising a substrate and a plurality of nanostructures in physical contact with the substrate, the nanostructures increasing the conductive surface area of the first electrode, each of the plurality of nanostructures having a corresponding lengthwise axis, wherein each of at least a subset of the nanostructures is in physical contact with at least one other of the plurality of nanostructures, such that the lengthwise axes of the nanostructures in physical contact are nonparallel;
a solid, non-conductive interlayer deposited over the nanostructures to coat the nanostructures, and extending between the nanostructures; and
a second electrode deposited over the interlayer and extending between the nanostructures.

2. A capacitor according to claim 1, further comprising a conductive first separator layer deposited between the first electrode and the interlayer.

3. A capacitor according to claim 2, wherein the nanostructures are non-conductive.

4. A capacitor according to claim 1, wherein the nanostructures comprise magnetic nanostructures.

5. A capacitor according to claim 1, further comprising a second separator layer deposited between the interlayer and the second electrode.

6. A capacitor according to claim 1, wherein the height of the nanostructures exceeds the diameter of the nanostructures by a factor of 100 or greater.

7. A capacitor according to claim 1, wherein the height of the nanostructures exceeds the diameter of the nanostructures by a factor of 1000 or greater.

8. A capacitor according to claim 1, wherein the nanostructures comprise a material different from the substrate material.

9. A capacitor according to claim 1, wherein the nanostructures are formed and then deposited on the substrate.

10. A capacitor according to claim 1, wherein the capacitor has a charge density of 1 Coulomb per $cm^2$ of substrate.

11. A capacitor formed from a plurality of nanostructures, wherein each of at least a subset of the nanostructures is in physical contact with at least one other of the plurality of nanostructures such that lengthwise axes of the nanostructures in contact with one another are nonparallel, the capacitor having a plurality of layers arranged such that a cross-section taken perpendicular to a lengthwise axis of one nanostructure, from an outer circumferential surface of the nanostructure, through the nanostructure, to an outer circumferential surface of an adjacent nanostructure, comprises:
a first electrode layer comprising the nanostructure;
a solid, non-conductive interlayer; and
a second electrode layer.

* * * * *